(12) United States Patent
Hu et al.

(10) Patent No.: US 12,360,518 B1
(45) Date of Patent: Jul. 15, 2025

(54) DIGITAL TWIN INTELLIGENT EDGE TERMINAL AND OPERATION METHOD THEREFOR

(71) Applicant: Shandong University, Jinan (CN)

(72) Inventors: Tianliang Hu, Jinan (CN); Qi Meng, Jinan (CN); Shuaichang Zhou, Jinan (CN); Fei Tao, Jinan (CN)

(73) Assignee: Shandong University, Jinan (CN)

( * ) Notice: Subject to any disclaimer, the term of this patent is extended or adjusted under 35 U.S.C. 154(b) by 0 days.

(21) Appl. No.: 18/972,117

(22) Filed: Dec. 6, 2024

(30) Foreign Application Priority Data

Aug. 2, 2024 (CN) .......................... 202411052681.6

(51) Int. Cl.
G05B 19/418 (2006.01)
(52) U.S. Cl.
CPC ... G05B 19/41885 (2013.01); G05B 19/4185 (2013.01); *G05B 2219/36133* (2013.01)
(58) Field of Classification Search
CPC .......... G05B 19/41885; G05B 19/4185; G05B 2219/36133
USPC .............................................................. 700/9
See application file for complete search history.

(56) References Cited

U.S. PATENT DOCUMENTS

| | | | | |
|---|---|---|---|---|
| 2018/0328697 | A1* | 11/2018 | Sampat | F41G 5/24 |
| 2018/0341235 | A1* | 11/2018 | Oda | G05B 15/02 |
| 2019/0154266 | A1* | 5/2019 | Egenter | G08C 17/02 |
| 2024/0104270 | A1* | 3/2024 | Das | G06F 30/27 |

FOREIGN PATENT DOCUMENTS

| | | |
|---|---|---|
| CN | 113485156 A | 10/2021 |
| CN | 115982849 A | 4/2023 |
| CN | 117614949 A | 2/2024 |

\* cited by examiner

*Primary Examiner* — Thomas C Lee
*Assistant Examiner* — Michael Tang
(74) *Attorney, Agent, or Firm* — Nitin Kaushik (57) ABSTRACT

Implementations of the present invention provide a digital twin intelligent edge terminal and an operation method therefor pertaining to the field of digital twin terminals. The terminal comprises: a state perception module physically connected to a cloud digital twin system and single or multiple application objects and sensors via various data interfaces; a decision reception and execution module configured to perform the dispatch of decision information according to whether a control system for controlling application objects has an instruction interface and a transmission protocol; a human-computer interaction module; a digital twin local control module interacting with the cloud digital twin system or collaborating with the state perception module, the decision reception and execution module, and the human-computer interaction module in different working modes; and a functional module manager implementing information interaction between the modules.

8 Claims, 6 Drawing Sheets

DIGITAL TWIN INTELLIGENT EDGE TERMINAL AND OPERATION METHOD THEREFOR

CROSS-REFERENCE TO RELATED APPLICATIONS

The application claims priority to Chinese patent application No. 202411052681.6, filed on Aug. 2, 2024, the entire contents of which are incorporated herein by reference.

TECHNICAL FIELD

The present invention relates to the technical field of digital twin terminals, and specifically to a digital twin intelligent edge terminal and an operation method therefor.

BACKGROUND

The birth of digital twin technology has promoted the process of Industry 4.0 and Industry 5.0. This technology has been applied to various stages throughout the entire production life cycle: design, manufacturing, debugging, operation, maintenance and recycling. A digital twin corresponds to its physical twin on a one-to-one basis and can accurately simulate behaviors of the physical twin in virtual space and respond to the physical twin with relatively low latency. Changes in either the digital twin or the physical twin will affect the other. As a result, a digital twin provides personalized, high-fidelity, real-time and controllable performance.

With the continuous development of technologies such as the Internet of Things, big data, and artificial intelligence, an increasing number of technologies related to digital twin and cyber-physical system are being applied and implemented, playing an important role in various industries, such as manufacturing, automobile, shipbuilding, aerospace, energy, construction, agriculture, and logistics. A digital twin system can be used in various stages such as design, manufacturing, debugging, maintenance, operation decision-making and optimization, and recycling.

However, some edge digital twin application objects lack information interaction interfaces with cloud digital twin systems. As a result, state data of edge application objects cannot be collected and uploaded, and decision information of cloud digital twin systems cannot be received and executed.

SUMMARY

A The objective of implementations of the present invention is to provide a digital twin intelligent edge terminal and an operation method therefor, which are used for fully or at least partially solving the above-mentioned technical problems existing in the prior art.

To achieve the above-mentioned objective, the implementations of the present invention provide a digital twin intelligent edge terminal interacting with a cloud digital twin system, comprising:

- a state perception module physically connecting the digital twin intelligent edge terminal to the cloud digital twin system and single or multiple application objects and external sensors via various data interfaces so as to acquire state perception information and upload the perception information to the cloud digital twin system for application;
- a decision reception and execution module having the functions of receiving a decision instruction on the cloud and executing the decision instruction on the edge side, and configured to select, according to whether a control system for controlling application objects has an instruction interface and a transmission protocol, a working mode to perform the dispatch of decision information;
- a human-computer interaction module having the functions of system configuration and information display, wherein the system configuration is characterized by configuring basic information of the digital twin intelligent edge terminal, configuring connection parameters between the digital twin intelligent edge terminal and the control system/external sensors/cloud digital twin system, configuring a data structure of the cloud digital twin system, and setting personnel permissions, and the information display is characterized by receiving and displaying the decision instruction and operation and maintenance information of the decision reception and execution module, and displaying the decision instruction and the operation and maintenance information according to the personnel permissions;
- a digital twin local control module configured with different working modes, and interacting with the cloud digital twin system or collaborating with the state perception module, the decision reception and execution module, and the human-computer interaction module in different working modes;
- a functional module manager integrated with a driver for the state perception module, the decision reception and execution module, the human-computer interaction module and the digital twin local control module, and configured to implement information interaction between the modules.

Optionally, the various data interfaces comprise, but are not limited to, an Ethernet interface, a USB interface, an RS-232 interface, an RS-485 interface, and a general-purpose I/O interface.

Optionally, the state perception module is configured with a function of collecting data for different transmission protocols, a function of data organization for heterogeneous data, and a function of uploading data in a unified format, and is configured to collect and upload data information.

Optionally, the decision reception and execution module having the functions of receiving a decision instruction on the cloud and executing the decision instruction on the edge side, and configured to select, according to whether a control system for controlling application objects has an instruction interface and a transmission protocol, a working mode to perform the dispatch of decision information, comprises:

- when the control system for the current application object has an instruction interface and a transmission protocol, the decision reception and execution module receiving the decision information dispatched by the cloud digital twin system, and parsing the decision information to obtain a portion of the decision information that belongs to the current application object;
- translating, according to an instruction structure of the control system, the portion of the decision information, that belongs to the current application object, into operation instructions of the control system so as to cause the control system to control the current application object;
- when the control system for the current application object does not have an instruction interface and a transmission protocol, the decision reception and execution module receiving the decision information dispatched by the cloud digital twin system, and parsing the decision information to obtain a portion of the decision information that belongs to the current application object; and outputting the portion of the decision information, that belongs to the current application object, to the human-computer interaction module for display so as to enable operation and maintenance personnel to operate according to prompts.

Optionally, the digital twin local control module configured with different working modes, and interacting with the cloud digital twin system or collaborating with the state perception module, the decision reception and execution module, and the human-computer interaction module in different working modes, comprises:

when the cloud digital twin system is online, the digital twin local control module interacting with the cloud digital twin system, and migrating, at a preset period, a cloud digital twin system model in the cloud digital twin system to the digital twin local control module for iteration and update; and when the cloud digital twin system is offline, the digital twin local control module collaborating with the state perception module, the decision reception and execution module, and the human-computer interaction module to perform state perception and make corresponding decision control.

In another aspect, the present invention further provides an operation method for the digital twin intelligent edge terminal, comprising:

collecting data variables of the control system for application objects and sensing data of the external sensors, and performing an ordering process on the data variables and the sensing data to obtain target data;

uploading, according to a connection state of the cloud digital twin system, the target data to the cloud digital twin system or a local digital twin control module to generate decision control information, and obtaining, through the parsing performed by the decision reception and execution module, a portion of the decision information that belongs to the current application object;

performing decision control over the application object according to whether the control system for controlling application objects has an interface or a protocol.

Optionally, uploading, according to a connection state of the cloud digital twin system, the target data to the cloud digital twin system or the local digital twin control module to generate decision control information, and obtaining, through the parsing performed by the decision reception and execution module, the portion of the decision information that belongs to the current application object comprises:

determining whether the cloud digital twin system is online, and if the cloud digital twin system is online, uploading the target data to the cloud digital twin system to generate the decision control information;

outputting the decision control information to the decision reception and execution module, and obtaining the portion of the decision information that belongs to the current application object by parsing; and if the cloud digital twin system is not online, enabling the local digital twin control module to generate the decision control information, and transmitting the decision control information to the decision reception and execution module, and obtaining the portion of the decision information that belongs to the current application object by parsing.

Optionally, performing decision control over the application object according to whether the control system for controlling application objects has an interface or a protocol comprises:

determining whether the control system for controlling application objects has an interface or a protocol, if the control system for controlling application objects has an interface or a protocol, translating the portion of the decision information, that belongs to the current application object, into operation instructions of the control system, so as to cause the control system to perform decision control over the application object, and if the control system for controlling application objects does not have an interface or a protocol, outputting the decision information, which is output by the decision reception and execution module, to the human-computer interaction module for display so as to enable operation and maintenance personnel to perform decision control according to prompts.

In another aspect, the present invention further provides an electronic device, comprising a memory, a processor, and a computer program stored on the memory and executable on the processor. The steps of the operation method for the digital twin intelligent edge terminal are implemented when the processor executes the program.

In another aspect, the present invention further provides a non-transitory computer-readable storage medium having stored thereon a computer program. The steps of the operation method for the digital twin intelligent edge terminal are implemented when the computer program is executed by a processor.

Compared to the prior art, the beneficial effects achieved by the present application are as follows: by means of the digital twin intelligent edge terminal, different data interfaces, different types, and single or multiple application objects at an edge can access the cloud digital twin system, and by means of a "cloud-edge" data interaction channel built by the terminal, collection and upload of edge application object state data and reception and execution of decision information of the cloud digital twin system are implemented.

Other features and advantages of the implementations of the present invention will be described in detail in the specific embodiments below.

BRIEF DESCRIPTION OF DRAWINGS

The accompanying drawings are used to provide a further understanding of the implementations of the present invention and constitute a part of the specification. They are used to explain the implementations of the present invention together with the specific embodiments below, but do not constitute a limitation to the implementations of the present invention. In the accompanying drawings.

DETAILED DESCRIPTION OF THE EMBODIMENTS

Specific embodiments of the implementations of the present invention will be described in detail below with reference to the accompanying drawings. It should be understood that the specific embodiments described herein are merely illustrative of the implementations of the present invention and are not intended to limit the implementations of the present invention.

Figure 1:
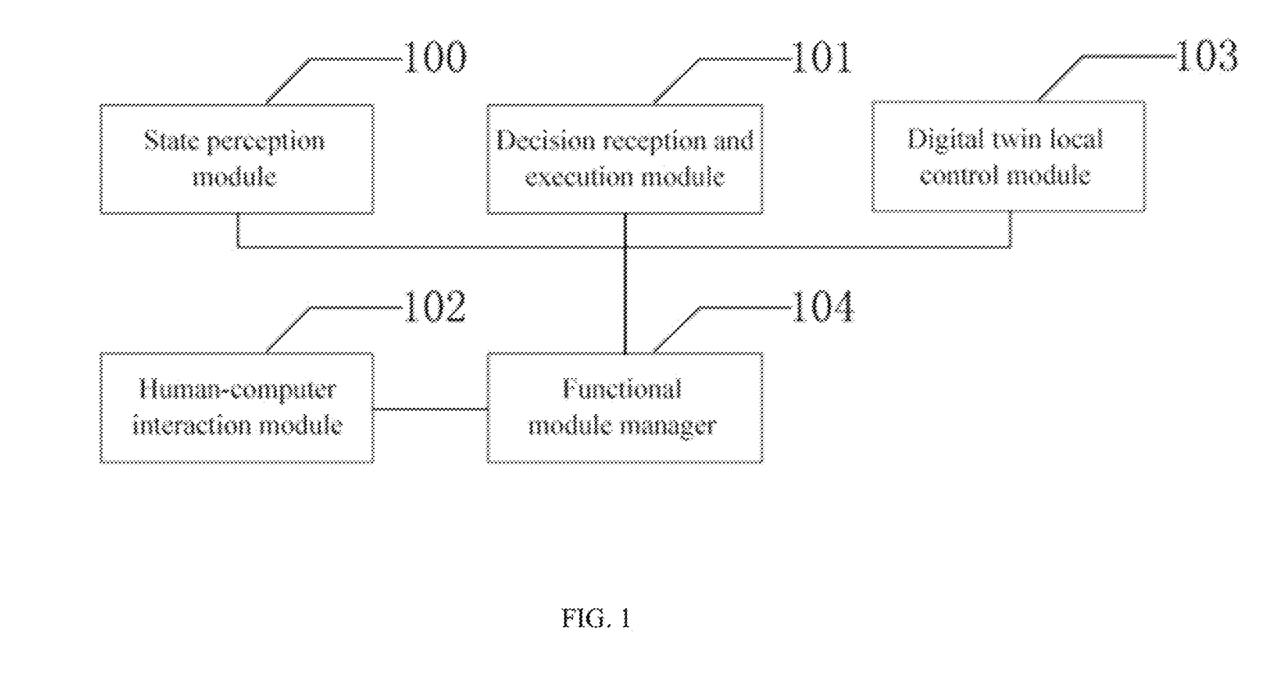
FIG. 1 is a schematic structural diagram of a digital twin intelligent edge terminal provided by an implementation of the present invention.

FIG. 1 is a schematic structural diagram of a digital twin intelligent edge terminal provided by an implementation of the present invention. The digital twin intelligent edge terminal interacts with a cloud digital twin system, comprising:

a state perception module 100 physically connecting the digital twin intelligent edge terminal to the cloud digital twin system and single or multiple application objects and external sensors via various data interfaces, so as to acquire state perception information, and upload the state perception information to the cloud digital twin system for application, wherein the various data interfaces comprise, but are not limited to an Ethernet interface, a USB interface, an RS-232 interface, an RS-485 interface, and a general-purpose I/O interface, etc., which cover common connection requirements, and further have flexible interface expansion capabilities to adapt to future novel devices and terminals.

It should be noted that the state perception module is configured with a function of collecting data for different transmission protocols, a function of data organization for heterogeneous data, and a function of uploading data in a unified format, and is configured to collect and upload data information.

Specifically, the state perception module is further configured to parse and convert communication protocols of connected control systems, has a series of built-in communication protocol parsing and conversion algorithms, and can identify various commonly used communication protocols and perform protocol conversion, such as TCP, Modbus, CANopen, PROFINET and OPCUA. On the basis of the above-mentioned module, different transmission protocols can be converted into a unified protocol, thus providing a data transmission channel for data collection. Specially designed data collection chips are provided, such as a field-programmable gate array (FPGA) or an application-specific integrated circuit (ASIC). These chips can implement high-speed and low-latency data processing and transmission. Efficient data collection algorithms are further used, such as a direct memory access (DMA) technology, by which CPU intervention can be minimized during data transmission, thus enhancing the efficiency and speed of data transmission. The state perception module is further configured for the preprocess of the collected data. The specific workflow is as follows. Data filtering and cleaning: The state perception module removes noise, outliers and non-compliant data from the data by setting predefined data filtering rules and cleaning algorithms. These filtering and cleaning operations can effectively improve the quality and accuracy of the data, and ensure that the collected data meets system requirements and standards. Data format standardization: Standard data formats are used, such as JavaScript object notation (JSON) and extensible markup language (XML), so as to implement unified formatting and encoding of the collected data. In addition, the module further supports custom data formats and can flexibly configure a structure and content of the data according to user requirements. Data compression and optimization: To reduce data storage and transmission costs, the state perception module uses compression algorithms, such as LZ77, LZ78 and other lossless compression algorithms, as well as lossy compression algorithms such as Huffman coding and arithmetic coding, so as to compress the collected data. In terms of data transmission protocols, the module uses compressed transmission protocols, such as HTTP compressed transmission (gzip and deflate), so as to reduce bandwidth consumption of data transmission. The state perception module can provide a high-quality and standardized data foundation for subsequent data analysis and application through the ordering processes mentioned above. By means of the above flow, data variables of the control system and the external sensor can be collected and processed in an orderly manner, and the data is finally uploaded to the cloud digital twin system for application.

In some embodiments, the state perception module is a state sensor of an application object, comprises physical interfaces of different types, and has a function of collecting data for different transmission protocols, a function of data organization for heterogeneous data, and a function of uploading data in a unified format. The physical interfaces can implement physical connections between the terminal and the digital twin system, between the terminal and the control system for single or multiple application objects, and between the terminal and the external sensors. Data collection for different transmission protocols is used for acquiring the data variables in the control system and the external sensors. Data variables that can be directly read by the control system are parsed and converted into a unified transmission protocol and then collected. Data variables that cannot be directly read by the control system are connected to the external sensors by sensors integrated in the module or application programming interfaces (APIs) of a sensing system and then collected. Organization of heterogeneous data is to organize, according to a data structure of the cloud digital twin system, the data variables collected in the previous step, generate an address space for each data variable, and finally map the data to the cloud digital twin system according to address spaces. Data upload in a unified format is to perform operations, such as cleaning, smoothing and an ordering process, on the collected data, and then upload the collected data to the corresponding address spaces in the cloud digital twin system for the next application.

A decision reception and execution module 101 has the functions of receiving a decision instruction on the cloud and executing the decision instruction on the edge side, and is configured to select, according to whether the control system for controlling application objects has an instruction interface and a transmission protocol, a working mode to perform the dispatch of decision information.

Specifically, the decision reception and execution module 101 having the functions of receiving a decision instruction on the cloud and executing the decision instruction on the edge side, and configured to select, according to whether the control system for controlling application objects has an instruction interface and a transmission protocol, a working mode to perform the dispatch of decision information includes the following two cases.

Case 1: When the control system for the current application object has an instruction interface and a transmission protocol, the decision reception and execution module receives the decision information dispatched by the cloud digital twin system, and parses the decision information to obtain a portion of the decision information that belongs to the current application object. According to an instruction structure of the control system, the portion of the decision information that belongs to the current application object is translated into operation instructions of the control system so as to cause the control system to control the current application object.

Case 2: When the control system of the current application object does not have an instruction interface and a transmission protocol, the decision reception and execution module receives the decision information dispatched by the cloud digital twin system, and parses the decision information to obtain a portion of the decision information that belongs to the current application object. outputting the portion of the decision information, that belongs to the current application object, to the human-computer interaction module for display so as to enable operation and maintenance personnel to operate according to prompts.

It should be understood that the decision information and instructions cover operations such as starting, stopping, speed regulation, and pressure regulation of a device. The module can accurately identify and parse these instructions, and translate the instructions into an operation language of the control system.

In some embodiments, the decision reception and execution module is an extension of the control system for application objects, and has two functions of receiving a decision instruction on the cloud and executing the decision instruction on the edge side, which includes two cases. A first case is that reception of a decision instruction on the cloud indicates that the module receives the decision information of the cloud digital twin system, parses the decision information to obtain the portion that belongs to the current application object, and translates the decision information into the operation language of the control system according to the instruction structure of the control system. Execution of a decision instruction on the edge side indicates that the module parses and adapts to an instruction transmission interface and protocol of the control system, and inputs the translated decision instruction into the control system to control the application object. A second case is that a target control system does not have a corresponding instruction interface or protocol, and the control system cannot be controlled. In this case, corresponding information is output to the human-computer interaction module for display, and the operation and maintenance personnel performs the next operation. For example, when receiving a speed adjustment instruction, the module can adjust rotational speed settings of a device. When receiving a pressure regulation instruction, the module can adjust pressure parameters of the device to dynamically control and optimize the application object.

The human-computer interaction module 102 has the functions of system configuration and information display, wherein the system configuration is characterized by configuring basic information of the digital twin intelligent edge terminal, configuring connection parameters between the digital twin intelligent edge terminal and the control system/external sensors/cloud digital twin system, configuring the data structure of the cloud digital twin system, and setting personnel permissions, and the information display is characterized by receiving and displaying the decision instruction and operation and maintenance information of the decision reception and execution module, and displaying the decision instruction and the operation and maintenance information according to the personnel permissions.

It should be understood that system function configuration is to initialize the terminal, which is capable of setting a number/IP address of the terminal, configuring connection information between the terminal and the control system/external sensors/cloud digital twin system, granting the personnel permissions, etc. The information display is to view fault alarms, predictive maintenance, decision information that cannot be automatically executed in the decision reception and execution module, etc., according to the personnel permissions. When information cannot be executed directly, the operation and maintenance personnel can perform manual execution according to the information. System configuration of an intelligent terminal specifically comprises: basic parameter settings: configuring basic information of a device, such as a name, a model, and a serial number; network settings: configuring network parameters of the intelligent terminal, such as an IP address, a subnet mask, a gateway and a DNS, to ensure that the intelligent terminal can communicate normally with other devices in a network; user permissions: configuring access permissions and operation permissions for different users to ensure system security and operation standardization; communication settings: configuring communication protocols supported by the intelligent terminal, such as Wi-Fi, Bluetooth, Zigbee, and LoRa, to facilitate data interaction with other devices; data collection: configuring a frequency and mode of data collection to ensure real-time monitoring and recording of important parameters; data storage policies: setting a storage location and storage period of data, and managing storage and deletion policies of historical data; debugging tools: providing debugging tools and interfaces to facilitate technicians to debug and test the device; and maintenance plans: configuring maintenance plans and maintenance records of the device to ensure normal operation of the device and prolong the service life of the device.

It should be understood that the information display is to display information in an intuitive manner on a human-computer interaction interface. By means of graphical interface design and real-time updated data display, the operation and maintenance personnel can clearly know a current state of the device. The information display is specifically as follows. Key component life display: The human-computer interaction module can display life information of key components. By means of data analysis and prediction functions provided by the digital twin system, the module can monitor a health state and remaining life of key components of the device in real time, and provide timely maintenance reminders and early-warning information for the operation and maintenance personnel, thus helping to prevent device faults and improve production efficiency. Maintenance information display: The human-computer interaction module can receive and display maintenance information dispatched by the digital twin system, comprising maintenance plans, maintenance tasks, maintenance records, etc. The operation and maintenance personnel can view maintenance history and maintenance recommendations of the device by the module, and provide reference and guidance for regular maintenance and upkeep of the device.

A digital twin local control module 103 is configured with different working modes, and interacts with the cloud digital twin system or collaborates with the state perception module, the decision reception and execution module, and the human-computer interaction module in different working modes.

Specifically, the following two cases are included.

Case 1: When the cloud digital twin system is online, the digital twin local control module interacts with the cloud digital twin system, and migrates, at a preset period, a cloud digital twin system model in the cloud digital twin system to the digital twin local control module for iteration and update.

Case 2: When the cloud digital twin system is offline, the digital twin local control module collaborates with the state perception module, the decision reception and execution module, and the human-computer interaction module to perform state perception and make corresponding decision control.

The digital twin local control module preloads data and models of the cloud digital twin system to implement autonomous operation in network interruptions or offline environments.

In some embodiments, the digital twin local control module is configured as an edge simplification module of the cloud digital twin system, which is an optional module and comprises two working modes: an online mode and an offline mode. The module has functions similar to those of the cloud digital twin system. When the cloud system is online, the module migrates a cloud control model to this module, and performs continuous iteration and update according to a set period, but does not perform the dispatch of a decision instruction to the application object. When the cloud system is offline, the module will replace the cloud system to function, and collaborate with the state perception module, the decision reception and execution module, and the human-computer interaction module to perform state perception on the application object and make corresponding decision control. When the cloud system is online, the module automatically switches to the online mode.

A functional module manager 104 is integrated with a driver for the state perception module, the decision reception and execution module, the human-computer interaction module and the digital twin local control module, and is configured to implement information interaction between the modules.

In some embodiments, the implementations of the present invention further provide a digital twin intelligent edge system, comprising the following subsystems.

A state perception subsystem: The subsystem comprises data collection, data organization and data upload programs. The data collection program comprises data transmission protocol conversion algorithms, data collection algorithms and APIs of external sensors or sensing systems, and can perform data transmission protocol conversion and data collection for different types of control systems and external sensors. The data organization program organizes collected data according to the data structure of the cloud digital twin system. The data upload program includes commonly used data preprocessing algorithms. Operations, such as cleaning, smoothing and an ordering process, are performed on the collected data, and the collected data is then uploaded to the cloud digital twin system for application.

A decision reception and execution subsystem: The subsystem comprises decision reception and decision execution programs. The decision reception program includes instruction analysis and conversion algorithms, and can obtain a decision instruction that belongs to the current application object by filtering, and translate the decision instruction into the operation language of the control system. The decision execution program includes connection protocols for a variety of control systems, and can parse and adapt to instruction interfaces and protocols of the control systems, and apply decision instructions to the control systems. The program can further interact with the human-computer interaction subsystem. When the control system does not have a corresponding interface or protocol, relevant information is output to the human-computer interaction program for display.

A human-computer interaction subsystem: The subsystem comprises system function configuration and information display programs. The system function configuration program can set the number/IP address of the terminal, configure the connection information between the terminal and the control system/external sensors/cloud digital twin system, configure a cloud data structure, set operation and maintenance personnel permissions, etc. The information display program can receive and display decision information, operation and maintenance information, etc. in the decision reception and execution module, and display such information according to the personnel permissions.

A digital twin local control subsystem: The subsystem comprises an online program and an offline program. The online program can interact with the cloud digital twin system and periodically migrate and update the cloud system to a local module. The offline program is enabled when the cloud is offline, and replaces the cloud system to perform decision control. When the cloud is online, the online program is automatically enabled.

In some embodiments, the cloud digital twin system comprises: a data collection module configured to acquire real-time perception data of the personnel, robots, fixed devices and job objects in a human-machine collaborative operation system on a physical space side, and transmit the real-time perception data to a cloud side by a cloud-edge collaborative interaction center; a model building module building a human-machine collaborative digital twin system on the cloud side according to the real-time perception data and mechanism modeling, wherein the human-machine collaborative digital twin system comprises a personnel digital twin model, a robot digital twin model, a fixed device digital twin model, and a job object digital twin model; a collaborative decision-making center disposed on the cloud side, and configured to comprehensively utilize collaborative interaction information among the personnel digital twin model, the robot digital twin model, and the fixed device digital twin model, identify action intentions of the personnel, robots, and fixed devices, plan collaborative jobs of the personnel, robots, and fixed devices, and guide the operation of the personnel digital twin model, the robot digital twin model, and the fixed device digital twin model; a decision-making guidance module configured to feed the planning guidance content to the human-machine collaboration system on the physical space side by the cloud-edge collaborative interaction center, so as to cause the human-machine collaboration system to perform a job regarding the job object, wherein the cloud-edge collaborative interaction center is disposed between the physical space side and the cloud side, and performs information interaction between the physical space side and the cloud side.

Figure 2:
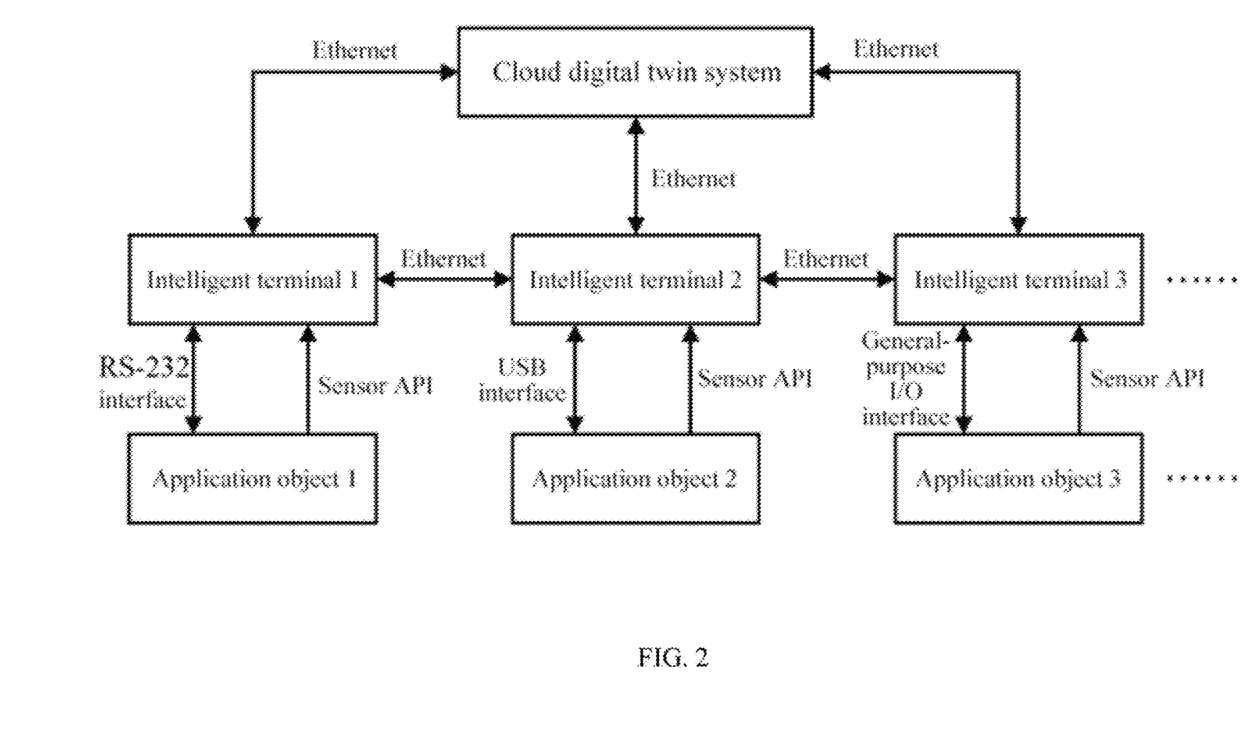
FIG. 2 is a schematic diagram of a digital twin intelligent edge terminal connected to a single application object provided by an implementation of the present invention.

FIG. 2 is a schematic diagram of a digital twin intelligent edge terminal connected to a single application object provided by an implementation of the present invention. Physical interfaces (Ethernet) of intelligent terminals (intelligent terminal 1, intelligent terminal 2, intelligent terminal 3, . . . ) are used to physically connect to a cloud digital twin system, application objects (application object 1, application object 2, application object 3, . . . ) corresponding to different communication protocols (RS_232 interface, sensor API, USB interface and general-purpose I/O interface), and other terminals. Functions of modules are then used to finally implement data interaction and decision control between the cloud digital twin system and the application objects.

Figure 3:
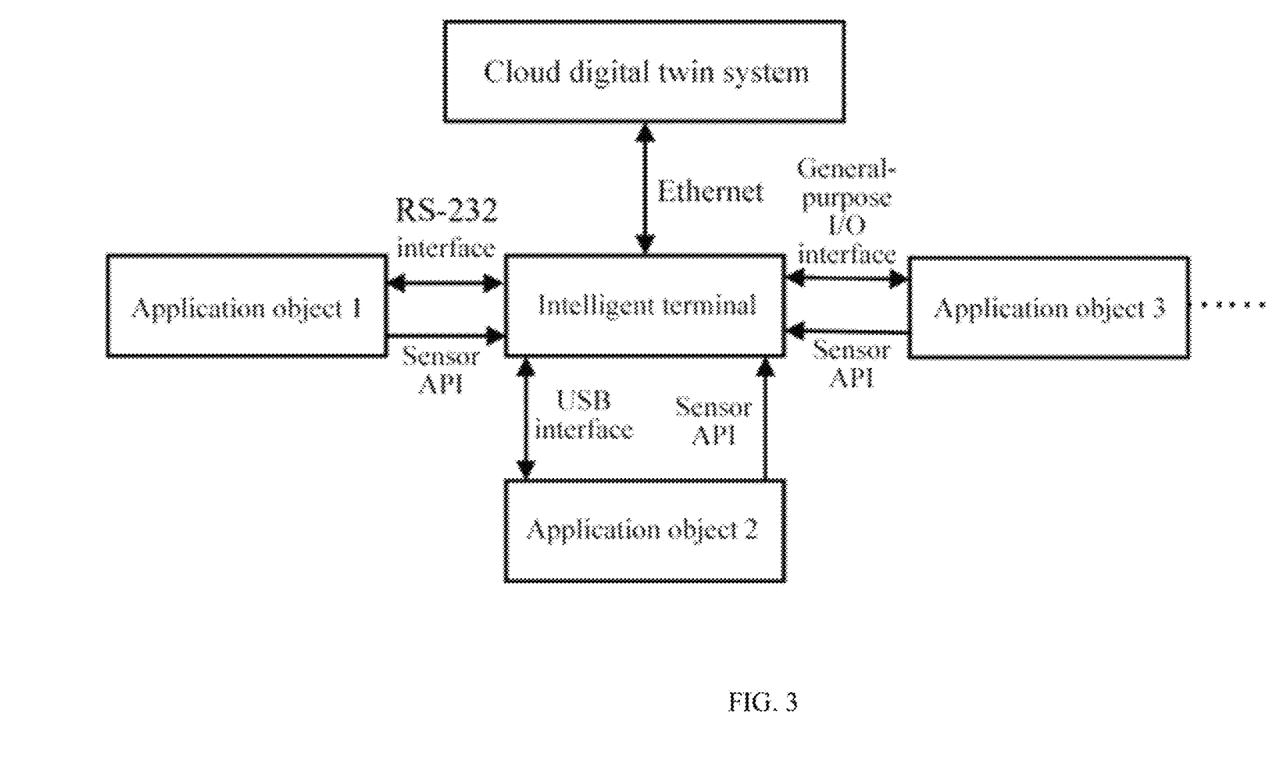
FIG. 3 is a schematic diagram of a digital twin intelligent edge terminal connected to multiple application objects provided by an implementation of the present invention.

FIG. 3 is a schematic diagram of a digital twin intelligent edge terminal connected to multiple application objects provided by an implementation of the present invention. Physical interfaces (Ethernet) of an intelligent terminal are used to physically connect to a cloud digital twin system, application objects (application object 1, application object 2, application object 3, . . . ) corresponding to different communication protocols (RS_232 interface, sensor API, USB interface and general-purpose I/O interface), and other terminals. Functions of modules are then used to finally implement data interaction and decision control between the cloud digital twin system and the application objects.

Figure 4:
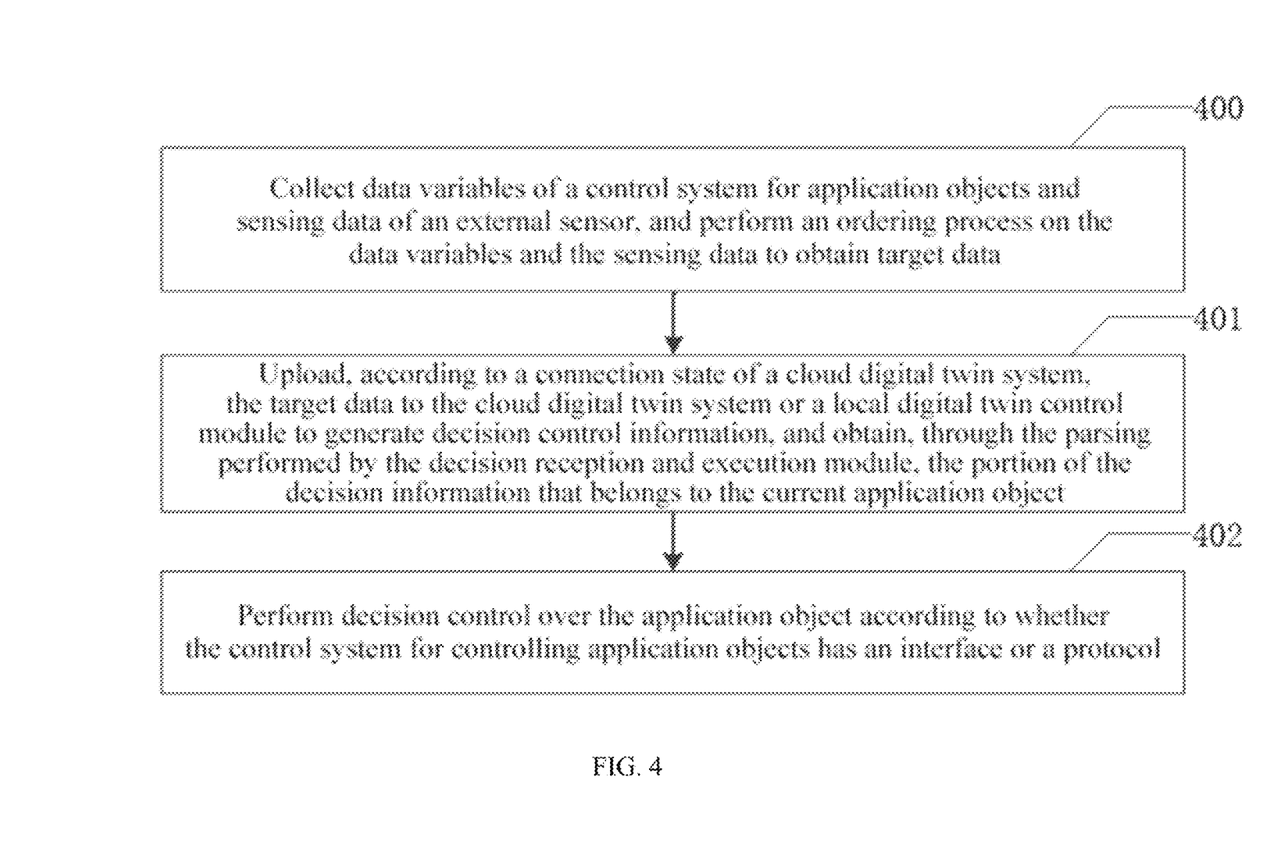
FIG. 4 is a flow chart of an operation method applied to a digital twin intelligent edge terminal provided by an implementation of the present invention.

FIG. 4 is a flow chart of an operation method applied to a digital twin intelligent edge terminal provided by an implementation of the present invention, comprising the following execution steps.

Step 400: Collect data variables of a control system for application objects and sensing data of external sensors, and perform an ordering process on the data variables and the sensing data to obtain target data.

Specifically, before executing step 400, the following steps are further executed:
S1: Use physical interfaces of a terminal to connect to an application object, external sensors and a cloud digital twin system to build physical channels for data interaction.
S2: Use a human-computer interaction module to set basic information of the terminal, configure connection between the terminal and the control system/external sensors/cloud system, and configure personnel permissions.
S3: Parse and convert a communication protocol of the control system, use a built-in API to connect to the external sensors, set a type, frequency, duration, etc. of data, and collect the data variables of the control system and the external sensors.
S4: Use built-in data organization and upload programs in a data perception module to reorganize collected data according to a data structure of the cloud digital twin system, generate an address space for each data variable, and finally upload, according to the address spaces, the data variables to the cloud digital twin system for application.

By means of the above steps, the intelligent terminal can collect data of the application object and the external sensors, and uploads the data in an ordered manner.

Step 401: Upload, according to a connection state of the cloud digital twin system, the target data to the cloud digital twin system or a local digital twin control module to generate decision control information, and obtain, through the parsing performed by a decision reception and execution module, a portion of decision information that belongs to the current application object.

Specifically, when executing step 401, the following steps may be specifically executed:
S4010: Determine whether the cloud digital twin system is online, and if the cloud digital twin system is online, upload the target data to the cloud digital twin system to generate the decision control information.
S4011: Output the decision control information to the decision reception and execution module, and obtain the portion of the decision information that belongs to the current application object by parsing.
S4012: If the cloud digital twin system is not online, enable the local digital twin control module to generate the decision control information, transmit the decision control information to the decision reception and execution module, and obtain the portion of the decision information that belongs to the current application object by parsing.

Step 402: Perform decision control over the application object according to whether the control system for controlling application objects has an interface or a protocol.

Specifically, when executing step 402, the following steps may be specifically executed:
S4020: Determine whether the control system for controlling application objects has an interface or a protocol, and if the control system for controlling application objects has an interface or a protocol, translate the portion of the decision information, that belongs to the current application object, into operation instructions of the control system so as to cause the control system to perform decision control over the application object.
S4021: If the control system for controlling application objects does not have an interface or a protocol, output the decision information, which is output by the decision reception and execution module, to the human-computer interaction module for display so as to enable operation and maintenance personnel to perform decision control according to prompts.

In some embodiments, a policy reception and execution module is used to receive the decision information from the digital twin system, parse a type of an operation language of the control system, and convert the decision information into the operation language of the control system. Then, the policy reception and execution module parses and adapts to a transmission interface and protocol of the control system, and inputs the converted operation language into the control system to control the application object. If a target control system does not have a corresponding transmission interface or protocol, corresponding information is output to the human-computer interaction module for display, and is operated by the operation and maintenance personnel. By means of the above steps, the intelligent terminal receives the decision information of the cloud digital twin system and executes the decision instruction on an edge side.

The human-computer interaction module displays a received predictive maintenance policy, a health state, the decision information of the decision reception and execution module, etc., and displays the received predictive maintenance policy, the health state, the decision information of the decision reception and execution module, etc. according to the personnel permissions. When the intelligent terminal cannot be connected to a cloud, the cloud digital twin system is replaced with the digital twin local control module for decision control. When the cloud system is online, the control system automatically switches to the cloud system, and regularly migrates the cloud system to a local module. By means of the above steps, the decision control of the application object by the digital twin system in an offline state can be implemented.

Figure 5A:
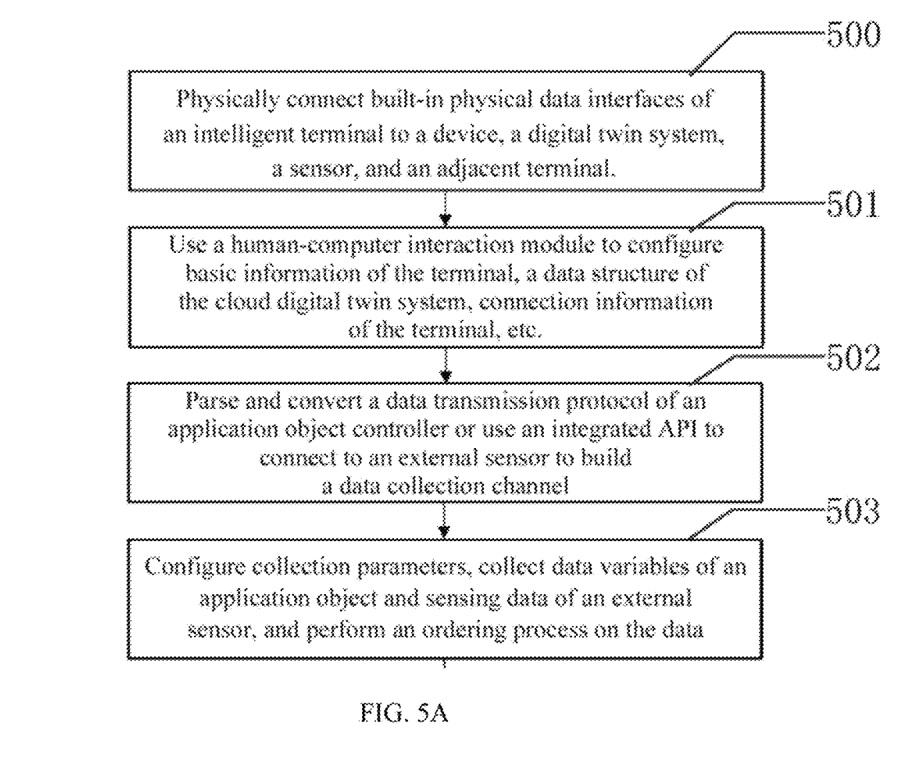
FIGS. 5A and 5B is a detailed flow chart of an operation method applied to a digital twin intelligent edge terminal provided by an implementation of the present invention.
Figure 5B:
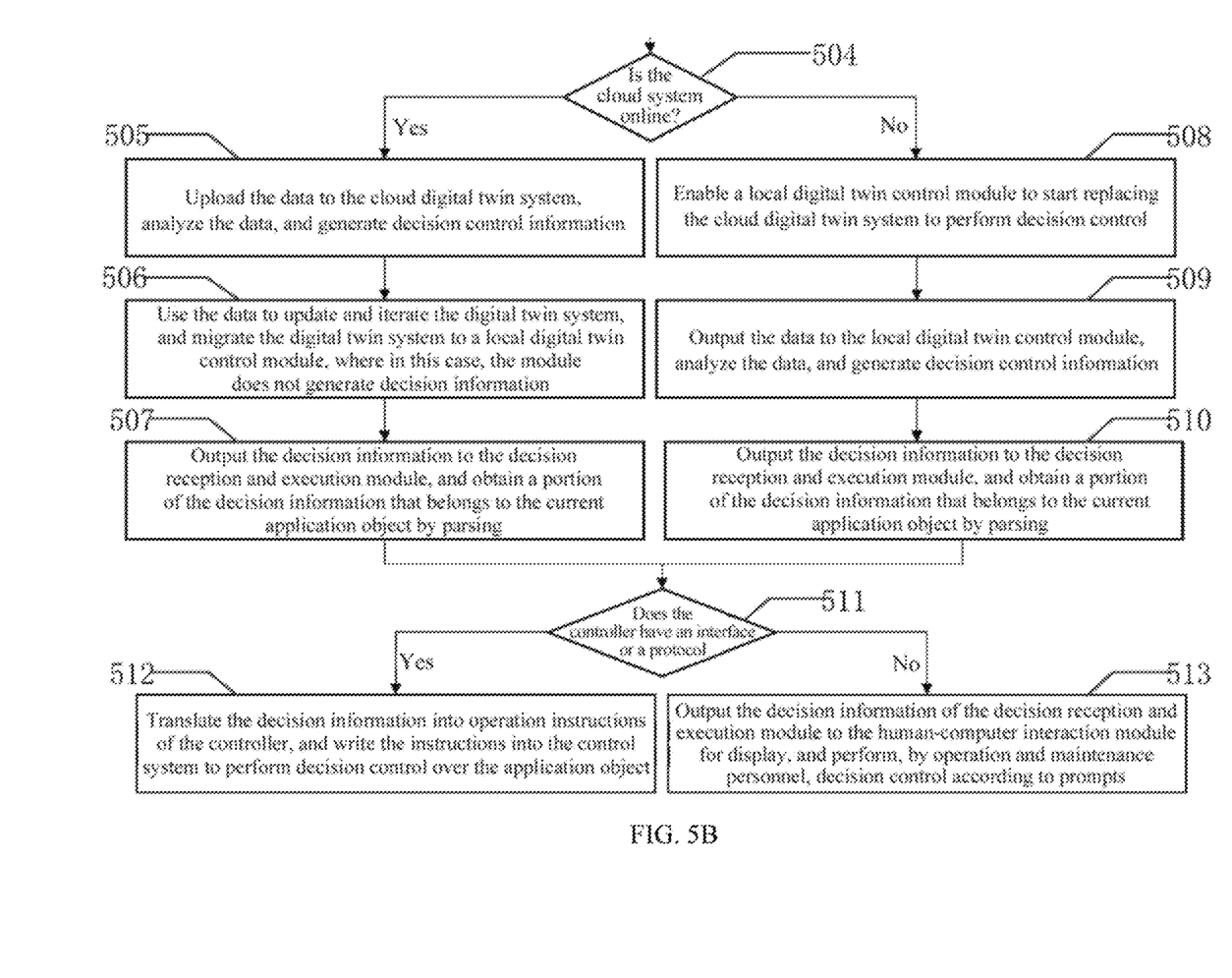

FIGS. 5A and 5B is a detailed flow chart of an operation method applied to a digital twin intelligent edge terminal provided by an implementation of the present invention, comprising the following execution steps:
S500: Physically connect built-in physical data interfaces of an intelligent terminal to a device, a digital twin system, a sensor, and an adjacent terminal.

S501: Use a human-computer interaction module to configure basic information of the terminal, a data structure of the cloud digital twin system, and connection information of the terminal.

S502: Parse and convert a data transmission protocol of an application object controller or use an integrated API to connect to an external sensor to build a data collection channel.

S503: Configure collection parameters, collect data variables of an application object and sensing data of the external sensor, and perform an ordering process on the data.

S504: Determine whether the cloud system is online, and if the cloud system is online, execute step S505, otherwise, execute step S508.

S505: Upload the data to the cloud digital twin system, analyze the data, and generate decision control information.

S506: Use the data to update and iterate the digital twin system, and migrate the digital twin system to a local digital twin control module, where in this case, the module does not generate decision information.

S507: Output the decision information to the decision reception and execution module, and obtain a portion that belongs to the current application object by parsing.

S508: Enable the local digital twin control module to start replacing the cloud digital twin system to perform decision control.

S509: Output the data to the local digital twin control module, analyze the data, and generate decision control information.

S510: Output the decision information to the decision reception and execution module, and obtain the portion that belongs to the current application object by parsing.

S511: Determine whether the controller has an interface or a protocol, and if the controller has an interface or a protocol, execute step S512, otherwise, execute step S513.

S512: Translate the decision information into operation instructions of the controller, and write the instructions into the control system to perform decision control over the application object.

S513: Output the decision information of the decision reception and execution module to the human-computer interaction module for display, and perform, by operation and maintenance personnel, decision control according to prompts.

In another aspect, the present invention further provides an electronic device, comprising a memory, a processor, and a computer program stored on the memory and executable on the processor. The steps of the operation method for the digital twin intelligent edge terminal of any one of the above-mentioned implementations are implemented when the processor executes the program.

In another aspect, the present invention further provides a non-transitory computer-readable storage medium having stored thereon a computer program. The steps of the operation method for the digital twin intelligent edge terminal of any one of the above-mentioned implementations are implemented when the computer program is executed by a processor.

A person skilled in the art should understand that the implementations of the present application may be provided as a method, a system, or a computer program product. Therefore, the present application may use a form of hardware-only implementations, software-only implementations, or implementations with a combination of software and hardware. Moreover, the present application may use a form of a computer program product that is implemented on one or more computer-usable storage media (including but not limited to a disk memory, a CD-ROM, an optical memory, and the like) that include computer usable program codes.

The present application is described with reference to the flowcharts and/or block diagrams of the method, the device (system), and the computer program product according to the implementations of the present application. It should be understood that computer program instructions may be used to implement each process and/or each block in the flowcharts and/or the block diagrams and a combination of processes and/or blocks in the flowcharts and/or the block diagrams. These computer program instructions may be provided for a processor of a general-purpose computer, a dedicated computer, an embedded processor, or any other programmable data processing device to generate a machine, so that the instructions executed by the processor of the computer or any other programmable data processing device generate an apparatus for implementing a specific function defined in one or more processes in the flowcharts and/or in one or more blocks in the block diagrams.

These computer program instructions may alternatively be stored in a computer readable memory that can guide a computer or any other programmable data processing device to work in a specific manner, so that the instructions stored in the computer readable memory generate an article of manufacture including an instruction apparatus. The instruction apparatus implements a specific function defined in one or more processes in the flowcharts and/or in one or more blocks in the block diagrams.

These computer program instructions may alternatively be loaded onto a computer or another programmable data processing device, so that a series of operations and steps are performed on said computer or another programmable device to generate computer-implemented processing. Therefore, the instructions executed on said computer or another programmable device provide steps for implementing a specific function defined in one or more processes in the flowcharts and/or in one or more blocks in the block diagrams.

In a typical configuration, a computing device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer-readable medium.

The computer-readable medium includes persistent, non-persistent, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, a tape and disk storage or other magnetic storage device or any other non-transmission media that may be configured to store information that a computing device can access. Based on the definition in the specification, the computer-readable medium does not include transitory computer readable media (transitory media), such as a modulated data signal and a carrier.

It should also be noted that the terms "comprise", "include" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "comprise one . . . " does not exclude other same elements in the process, method, article or device which include the element.

The above includes merely some implementations of the present application, and is not intended to limit the present application. For a person skilled in the art, the present application may have various modifications and changes. Any modifications, equivalent substitutions, improvements, etc. made within the spirit and principle of the present application shall fall within the scope of the claims of the present application.

What is claimed is:

1. A digital twin intelligent edge terminal interacting with a cloud digital twin system, comprising:
    a state perception module physically connecting the digital twin intelligent edge terminal to the cloud digital twin system and single or multiple application objects and external sensors via various data interfaces so as to acquire perception information and upload the perception information to the cloud digital twin system for application;
    a decision reception and execution module configured to receive a decision instruction on the cloud and executing the decision instruction on the edge side, and select, according to whether a control system configured to control application objects has an instruction interface and a transmission protocol, a working mode to perform a dispatch of decision information;
    a human-computer interaction module configured to configure basic information of the digital twin intelligent edge terminal, connection parameters between the digital twin intelligent edge terminal and the control system/external sensors/cloud digital twin system, a data structure of the cloud digital twin system, set personnel permissions, receive and display the decision instruction and operation and maintenance information of the decision reception and execution module, and display the decision instruction and the operation and maintenance information according to the personnel permissions;
    a digital twin local control module configured to interact with the cloud digital twin system or collaborate with the state perception module, the decision reception and execution module, and the human-computer interaction module in different working modes;
    a functional module manager configured to drive the state perception module, the decision reception and execution module, the human-computer interaction module and the digital twin local control module, and implement information interaction between the modules;
    wherein the decision reception and execution module is further configured to:

when the control system for a current application object has an instruction interface and a transmission protocol, receive the decision information dispatched by the cloud digital twin system, and parsing the decision information to obtain a portion of the decision information that belongs to the current application object;
    translate, according to an instruction structure of the control system, the portion of the decision information, that belongs to the current application object, into operation instructions of the control system so as to cause the control system to control the current application object;
    control the current application object based on the operation instructions;
    when the control system for the current application object does not have an instruction interface and a transmission protocol, receive the decision information dispatched by the cloud digital twin system, and parse the decision information to obtain a portion of the decision information that belongs to the current application object;
    output the portion of the decision information, that belongs to the current application object, to the human-computer interaction module for display so as to enable operation and maintenance personnel to operate according to prompts; and
    display the portion of the decision information.

2. The digital twin intelligent edge terminal of claim 1, wherein the various data interfaces comprise, but are not limited to, an Ethernet interface, a USB interface, an RS-232 interface, an RS-485 interface, and a general-purpose I/O interface.

3. The digital twin intelligent edge terminal of claim 1, wherein the state perception module is configured with a function of collecting data for different transmission protocols, a function of data organization for heterogeneous data, and a function of uploading data in a unified format, and is configured to collect and upload data information.

4. The digital twin intelligent edge terminal of claim 1, wherein the digital twin local control module is further configured to
    when the cloud digital twin system is online, interact with the cloud digital twin system, and migrate, at a preset period, a cloud digital twin system model in the cloud digital twin system to the digital twin local control module for iteration and update; and
    when the cloud digital twin system is offline, collaborate with the state perception module, the decision reception and execution module, and the human-computer interaction module to perform state perception and make corresponding decision control.

5. An operation method for the digital twin intelligent edge terminal of claim 1, comprising:
    collecting data variables of the control system for application objects and sensing data of the external sensors, and performing an ordering process on the data variables and the sensing data to obtain target data;
    uploading, according to a connection state of the cloud digital twin system, the target data to the cloud digital twin system or the digital twin local control module to generate decision information, and obtaining, through the parsing performed by the decision reception and execution module, the portion of the decision information that belongs to the current application object;

performing decision control over the current application object according to whether the control system for controlling application objects has an interface or a protocol;

wherein uploading, according to a connection state of the cloud digital twin system, the target data to the cloud digital twin system or the digital twin local control module to generate decision information, and obtaining, through the parsing performed by the decision reception and execution module, the portion of the decision information that belongs to the current application object, comprises:

determining whether the cloud digital twin system is online, and if the cloud digital twin system is online, uploading the target data to the cloud digital twin system to generate the decision information;

outputting the decision information to the decision reception and execution module, and obtaining the portion of the decision information that belongs to the current application object by parsing; and if the cloud digital twin system is not online, enabling the digital twin local control module to generate the decision information, and transmitting the decision information to the decision reception and execution module, and obtaining the portion of the decision information that belongs to the current application object by parsing.

6. The operation method for the digital twin intelligent edge terminal of claim 5, wherein performing decision control over the current application object according to whether the control system for controlling application objects has an interface or a protocol comprises:

determining whether the control system for controlling application objects has an interface or a protocol, if the control system for controlling application objects has an interface or a protocol, translating the portion of the decision information, that belongs to the current application object, into operation instructions of the control system so as to cause the control system to perform decision control over the current application object; and if the control system for controlling application objects does not have an interface or a protocol, outputting the decision information, which is output by the decision reception and execution module, to the human-computer interaction module for display so as to enable operation and maintenance personnel to perform decision control according to prompts.

7. An electronic device, comprising a memory, a processor, and a computer program stored on the memory and executable on the processor, wherein the steps of the operation method for the digital twin intelligent edge terminal of claim 5 are implemented when the processor executes the program.

8. A non-transitory computer-readable storage medium having stored thereon a computer program, wherein the steps of the operation method for the digital twin intelligent edge terminal of claim 5 are implemented when the computer program is executed by a processor.

* * * * *